(12) United States Patent
Farnham et al.

(10) Patent No.: US 7,373,162 B2
(45) Date of Patent: May 13, 2008

(54) METHODS OF CONTROLLING TRANSMISSION POWER LEVELS IN AIR INTERFACE CHANNELS

(75) Inventors: Timothy David Farnham, Bristol (GB); Gregory Gamboa, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 793 days.

(21) Appl. No.: 10/777,185

(22) Filed: Feb. 13, 2004

(65) Prior Publication Data

US 2005/0163070 A1 Jul. 28, 2005

(30) Foreign Application Priority Data

Feb. 27, 2003 (GB) .................................. 0304497.1

(51) Int. Cl.
  H04B 7/00 (2006.01)
  H04Q 7/20 (2006.01)
(52) U.S. Cl. ................ 455/522; 455/127.2; 455/232.1; 455/241.1; 370/328; 370/342
(58) Field of Classification Search ............... 455/11.1, 455/13.4, 522, 15, 17, 20, 21, 69, 127.2, 455/232.1, 241.1, 553; 370/311, 320, 342, 370/328
See application file for complete search history.

(56) References Cited

U.S. PATENT DOCUMENTS

| 6,085,107 | A | | 7/2000 | Persson et al. | |
| 6,154,659 | A | * | 11/2000 | Jalali et al. | 455/522 |
| 6,208,869 | B1 | * | 3/2001 | Roberts et al. | 455/465 |
| 6,889,033 | B2 | * | 5/2005 | Bongfeldt | 455/11.1 |
| 6,898,192 | B2 | * | 5/2005 | Chheda et al. | 370/311 |
| 6,993,358 | B2 | | 1/2006 | Shiotsu et al. | |

(Continued)

FOREIGN PATENT DOCUMENTS

EP  1 091 503  4/2001

(Continued)

OTHER PUBLICATIONS

Sunil Kandukuri, et al., "Multi-Channel Power Control for Data Traffic in Wireless Networks", MoMuC'99 Featured Talk, 1999, pp. 82-92.

(Continued)

Primary Examiner—Tony T. Nguyen
(74) Attorney, Agent, or Firm—Oblon, Spivak, McClelland, Maier & Neustadt, P.C.

(57) ABSTRACT

The present invention relates to wireless communications, and in particular although not exclusively, to networks of indoor collocated or overlapping wireless coverage areas especially those intended for operation in unlicensed spectrum such as the Industrial Scientific and Medical (ISM) bands. The present invention provides a method of controlling the transmission power associated with an air interface channel, the method comprising determining a quality of service measure for a signal to be transmitted on a second air interference channel; determining an interference measure corresponding to the interference on said second air interface channel which will be caused by transmissions on said first air interface channel; requesting the changing of the transmission power associated with the first air interface channel when the signal is to be transmitted on the second air interface channel, when the quality of service measure is above a predetermined value and when the interference measure is above a predetermined value for said quality of service value.

19 Claims, 8 Drawing Sheets

U.S. PATENT DOCUMENTS

| | | |
|---|---|---|
| 7,016,676 B2 | 3/2006 | Walke et al. |
| 2001/0051530 A1 | 12/2001 | Shiotsu et al. |

FOREIGN PATENT DOCUMENTS

| | | |
|---|---|---|
| EP | 1 128 577 | 8/2001 |
| GB | 2 281 477 | 3/1995 |
| JP | 7-283763 | 10/1995 |
| JP | 2001-34575 | 12/2001 |
| JP | 2001-345756 | 12/2001 |
| JP | 2002-542639 | 12/2002 |
| JP | 2004-506381 | 2/2004 |
| JP | 2004-274745 | 9/2004 |
| WO | WO 00/49624 | 8/2000 |
| WO | WO 02/13457 A2 | 2/2002 |

OTHER PUBLICATIONS

Tim Farnham, et al., "Dynamic Reconfiguration & Efficient Resource Allocation for Indoor Broadband Wireless Networks", pp. 325-328, IEEE, 1997.

Tim Farnham, "An Asynchronous Time Division Multiplexing—Multiple Access Protocol for Indoor Wireless Multi-Service Networks", IEEE, 1997, pp. 918-922.

* cited by examiner

METHODS OF CONTROLLING TRANSMISSION POWER LEVELS IN AIR INTERFACE CHANNELS

FIELD OF THE INVENTION

The present invention relates to wireless communications, and in particular although not exclusively, to networks of indoor collocated or overlapping wireless coverage areas especially those intended for operation in unlicensed spectrum such as the Industrial Scientific and Medical (ISM) bands.

BACKGROUND OF THE INVENTION

Collocated wireless coverage areas using different channels can still interfere with each other, adjacent channel suppression depends largely on the receiver implementation and transmitted spectral mask. Similarly, overlapping or adjacent wireless LAN coverage areas using uncoordinated spread spectrum mechanisms such as direct sequence or frequency hop spread spectrum also "intentionally" interfere with each other to a certain extent when the same or adjacent channels are used at the same time. Typically these channels are defined by frequency, (as used in frequency division multiple access) time slot (time division multiple access), code (code division multiple access) or a combination. The level of interference on a given channel will depend on many factors including the signal strength of the wanted and interfering signals which in turn will depend on their transmission power level and the signal propagation environment, for example whether there is likely to be a strong multipath fading of the wanted or interfering signal as is typically difficult to predict in indoor environments.

The level of interference which is acceptable can also depend on what type of data is being transmitted. For example non-real time data such as email can be re-transmitted if not received correctly. However other types of real time data such as video base layer frames are more critical and sensitive to delays such as re-transmissions and therefore require a higher quality channel to deliver them in good time.

"Dynamic Reconfiguration and Efficient Resource Allocation for Indoor Broadband Wireless Networks" by Tim Farnham and Brian Foxon, Universal Personal Communications, 1998, ICUPC'98, IEEE 1998 International Conference, Vol 1, 1998, pages 53-57; describes an indoor radio access network having clusters of access points or base stations that use a combination of time division and frequency division multiple access mechanisms. The network sets different interference thresholds for type 1 (video) and type 2 (data) traffic, the type 1 threshold being lower as video is delay sensitive which means it needs to be sent first and accurately to avoid the need for re-transmission. The network switches between different channels when too many type 1 packets are waiting for transmission through an existing channel because its interference level is too high. The trigger for a channel change is based on the average buffer occupancy and error rate over time.

SUMMARY OF THE INVENTION

In general terms, the present invention provides a method of controlling a wireless network having at least one base station and one or more mobile stations each containing one or more radio transceivers, in which the power levels of channels allocated between a base station and a mobile station are dynamically varied in order to reduce the interference level on channels which are carrying traffic with a high quality of service level (QoS) requirement.

By controlling channel power levels, the network can optimise conditions for channels transmitting traffic (such as packets) requiring a high QoS. This may involve reducing the power levels on channels carrying traffic with a lower QoS requirement, which may, but need not, result in higher interference levels or larger delays for that lower QoS traffic. This enables more critical or sensitive data to be transmitted with greater accuracy, by providing a low interference channel when required, but without building into the network the need to maintain these low interference channels the whole time which would reduce capacity. Less critical or sensitive data can be transmitted using higher interference or lower QoS channels, thereby increasing the capacity of the network. If need be this data can be retransmitted as it is less sensitive to delays.

In particular, in one aspect the present invention provides a method of controlling the transmission power associated with an air interface channel, the method comprising determining a quality of service measure for a signal to be transmitted on a second air interface channel; determining an interference measure corresponding to the interference on said second air interface channel which will be caused by transmissions on said first air interface channel; requesting the changing of the transmission power associated with the first air interface channel when the signal is to be transmitted on the second air interface channel, when the quality service measure is above a predetermined value and when the interference measure is above a predetermined value for said quality of service value.

Preferably the transmission power associated with the first air interface channel is changed when the signal is to be transmitted on the second air interface channel.

Alternatively, if this is not possible, the transmission associated with the first air interface channel may be postponed or suppressed when the signal is to be transmitted on the second air interface channel.

The quality of service measure and the interference measure determinations may be based on the prediction of likely quality of service requirements and interference levels.

Determining the interference measure may determine whether the signal to be transmitted or received over the first air interface channel will occur within the same time frame as transmissions on the second air interface channel.

The air interface channels are associated with different air interface technologies, such as WLAN IEEE802.11 standards, or Bluetooth™ for PANs.

In another aspect the present invention provides a method of allocating power levels to transceivers in a wireless network having a base station and two or more mobile stations using said transceivers; the method comprising: determining whether a signal to be transmitted over a first said transceiver has a high QoS indicator; determining whether any of said other transceivers will cause a predetermined level of interference to occur on said first transceiver when said signal is to be transmitted; instructing the reduction of the transmission power levels of one or more said other transceivers when said traffic signal is transmitted over said first transceiver.

Preferably the transceivers are collocated.

In yet another aspect the present invention provides a method of allocating power levels to transceivers in a wireless network having a base station and two or more mobile stations using said transceivers; the method comprising: allocating one said transceiver for high quality of service signals; instructing another said transceiver to reduce its transmission power level if it would otherwise interfere with a high quality of service signal by above a predetermined amount.

In other aspects the invention provides corresponding apparatus for implementing these methods, as well as software or computer or processor code which is capable of controlling a computer or processor to carry out these methods.

BRIEF DESCRIPTION OF THE DRAWINGS

In order to better understand the invention, embodiments will now be described with reference to the following drawings, by way of example only and without intending to be limiting, in which:

FIG. 4a is a schematic of the transmission management arrangement for the base station of FIG. 2a;

DETAILED DESCRIPTION

Figure 1:
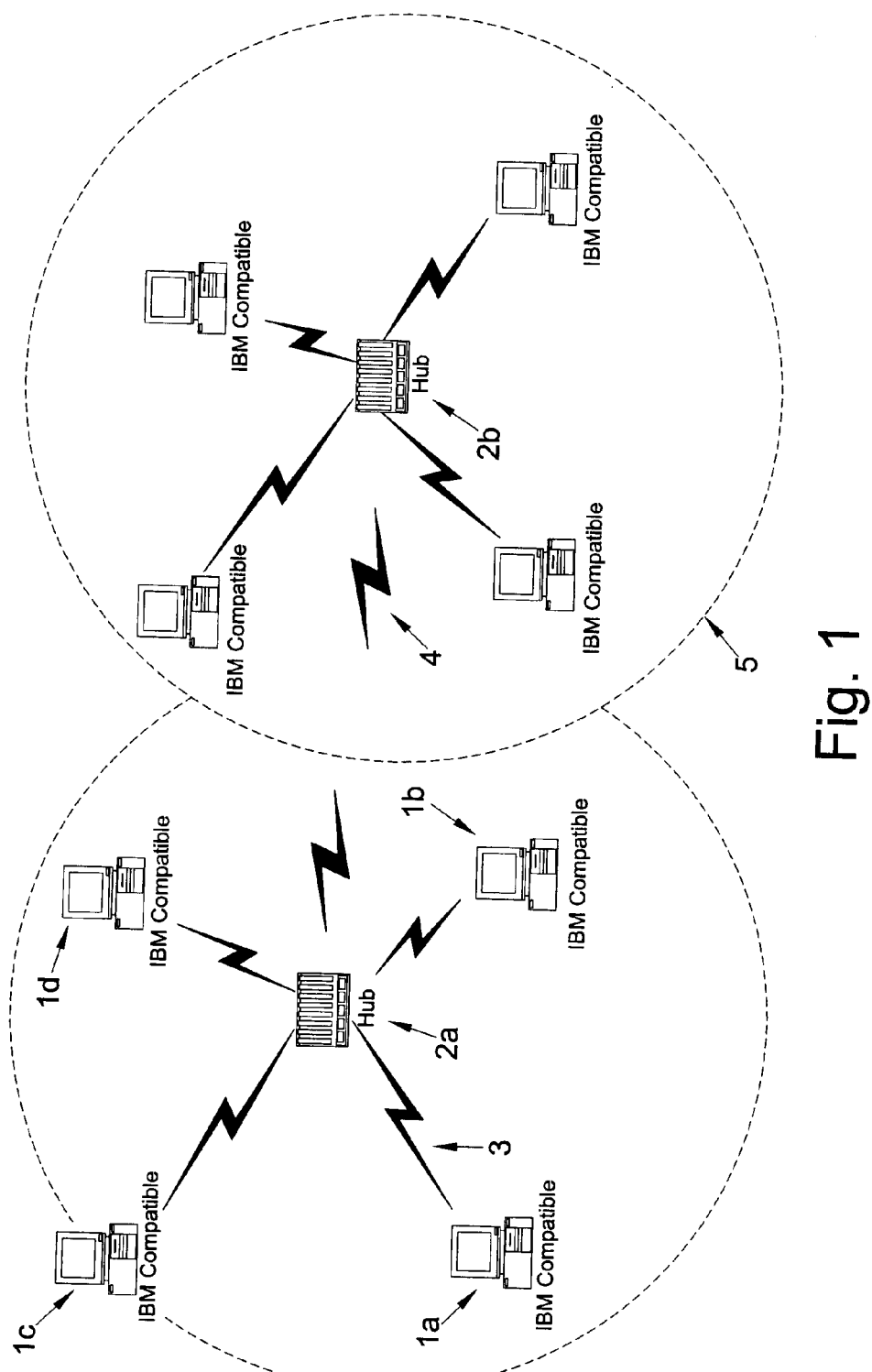
FIG. 1 is a schematic of a wireless network.

FIG. 1 shows an embodiment comprising a wireless network having one or more base stations or hubs 2 wirelessly coupled to a number of mobile stations 1. The network is arranged into one or more coverage areas 5. These coverage areas 5 might be PAN's (Personal Area Network) each comprising a number of collocated Bluetooth™ piconets each servicing a different mobile station 1 within the PAN. Alternatively the network might be a WLAN (Wireless Local Area Network) comprising adjacent or overlapping IEEE802.11 coverage areas 5 or a combination of PAN and WLAN. Wireless signals 3 couple each mobile station 1 to its corresponding base station 2. These signals 3 may also travel into adjacent areas 5 causing (especially) co-channel and adjacent channel interference (shown generally as 4).

Figure 2A:
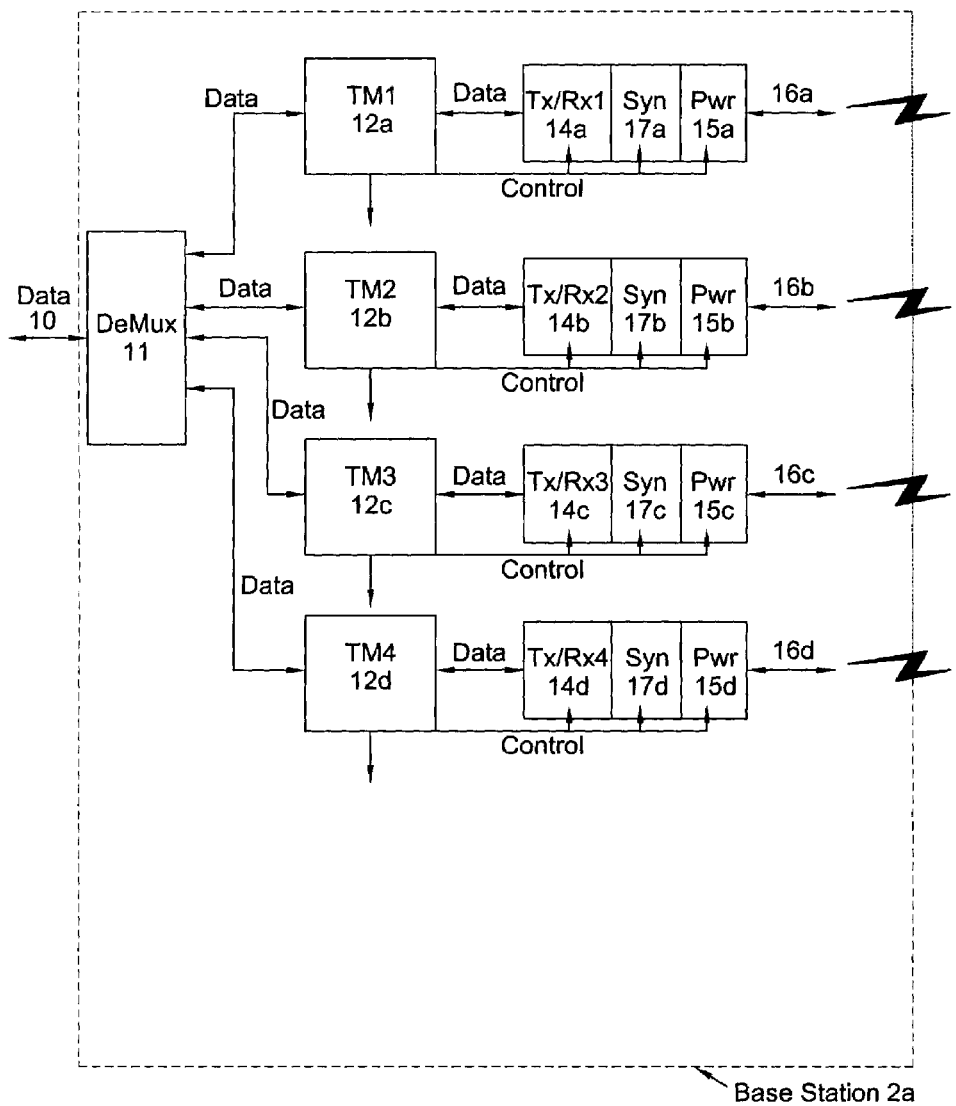
FIG. 2a is a schematic of a base station for the network of FIG. 1.

FIG. 2a is a schematic of a base station or access point 2a providing four air interface channel processing chains (shown generally as 16a, 16b, 16c, 16d) for communicating with mobile stations 1 within its coverage area 5. Each chain 16a-16d has associated transmission and/or reception functions for a radio access technology (such as radio signal modulation and demodulation, synchronisation, start of frame detection, frequency hopping, medium access control, link management, packet reception and transmission) or transceivers 14a-14d, each having a transmission power control function 15a-15d which controls the level of transmission power for that transceiver's signal 3 and synthesisers 17a, 17b, 17c, 17d for setting the transmit and receive frequency (or channel) of the transceiver 14.

The base station 2 may also comprise a multiplexer/demultiplexer 11 for interfacing between the separate air interface chains 16 and a combined data link 10 to the outside world; for example phone line, Ethernet LAN or other base stations in the case of a WLAN.

Figure 3:
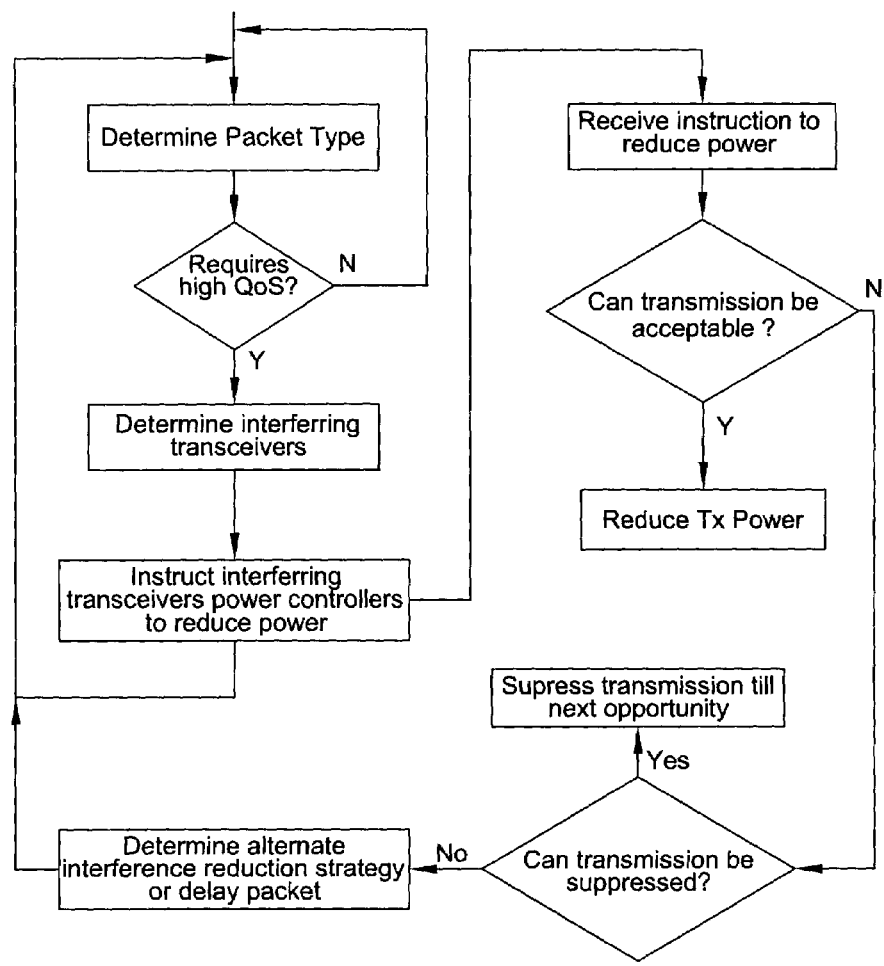
FIG. 3 is a flow chart showing a method of operating the base or mobile stations of FIG. 2.

Each air interface processing chain 16 is also associated with a transmission management function (TM) 12a-12d, which performs intelligent cooperative power management operations for the corresponding transceivers 14a, 14b, 14c, 14d and controls the transmission power levels of each transceiver 14 in the coverage area (eg Bluetooth™ piconet 5) through the corresponding power control functions 15, which can override air interface specific power control algorithms implemented within the transceivers 14. The detailed functionality required within the transmission management function 12 to support this power management can be seen with references to FIGS. 3 and 4.

The transmission management (TM) function 12a for a corresponding transceiver 14a first determines whether the next (or subsequent) packet(s) to be transmitted has a high Quality of Service requirement (QoS). This is indicated by a predetermined field within the packet or by analysing the packet type and size or by fixed priorities assigned to the different transceivers 14 and the method of packet classification implemented within the demultiplexer. The indication may be binary, that is either high (critical) or low (best effort); or there may be various levels of QoS requiring different handling.

If the next or subsequent packet(s) requires a high QoS (i.e. higher than can be achieved without intervention), then functionality within the TM function 12a determines estimates of the level of interference on the channel 3 that the transceiver 14a will be transmitting or receiving on for its next (or a predetermined) transmission slot (or other transmission period over which the packet will be transmitted) by interrogating the other TM functions 12b, 12c, 12d about their next transmission slots (in particular the frequency or channel and transmit/receive timing). By determining whether the transceivers 14b, 14c or 14d will be transmitting in the next slot, the TM function 12a can estimate the interference this is likely to cause in its receiver (14ar). This is also the level of interference that is likely to be observed at the receiving mobiles 1 of the transmission from the transmitter 14at. This is described in more detail later.

The present TM function 12a can also be configured to interrogate the mobile stations 1 of its own coverage area 5 (eg piconet) for their intended transmissions over the next transmission slot. It is also possible that the AIP function can estimate which mobiles are (or are likely) to be transmitting in the next time period. For example by analysing the transmission from the base station to the mobile or previous transmissions from the mobile to the base station.

In the case of a WLAN, in addition to determining whether the other 14b, 14c, 14d transceivers of the present base station 2a will be transmitting when present transceiver 14a intends to transmit or receive the high QoS packet(s), the TM function 12a can also determine whether radio transceivers in adjacent areas 5 will be transmitting during the next slot. It does this by interrogating the other base stations 2b, etc associated with those other areas 5 over the data link 10, which also provides the traffic and other control signals. The present TM function 12a may just interrogate the base stations 2a, etc of adjacent areas 5, or it may interrogate base stations 2 which are perhaps two or more areas 5 distant from the present base station 2a, depending on the signal propagation environment. Similarly, the mobile stations 1 communicating with these other base stations 2 may also be interrogated, or their likely transmissions estimated.

From all this information, or a sub-set of it, the TM function 12a is able to estimate the interference which will or is likely to occur in its associated channel of the transceiver 14a and the mobiles connected to this transceiver over the next transmission/reception slot. If this is above a predetermined threshold for a high QoS packet, then the TM function 12a selects an interfering transceiver 14b (or transceivers) and requests that the power on this be reduced by a predetermined amount for the next transmission slot in order to reduce the interference on the air interface processing chains 16a associated with the present transceiver 14a (and the mobiles connected via 14a) which is to transmit (or receive) the high QoS packet(s). Where there are a series of incoming or outgoing high QoS packets for transceiver 14a, the other transceivers 14b, 14c, 14d may simply be requested to reduce transmission power for the whole period of this series.

The transceiver 14b that is requested to reduce power receives the "reduce Tx power" request and determines whether the packet can still be transmitted at reduced power (with increased probability of packet loss). If not, then the packet is suppressed until the next transmission opportunity. If there is conflict due to too many high priority packets that cannot be suppressed that are being scheduled simultaneously, the TM can make a request to change channels, which may or may not be possible depending on the radio access technology. Otherwise the associated power control function 15b is instructed to reduce power by the requested amount for the next transmission slot (or period).

Whilst this method has been described in relation to the next transmission slot for ease of explanation, other arrangements could be used for example using transmission (and reception) sequences (as described in "An asynchronous time division multiplexing-multiple access protocol for indoor wireless multi-service networks", by T Farnham, Universal Personal Communications 1997, ICUPC '97 IEEE 6$^{th}$ International Conference, 12-16 Oct. 1997.

Figure 2B:
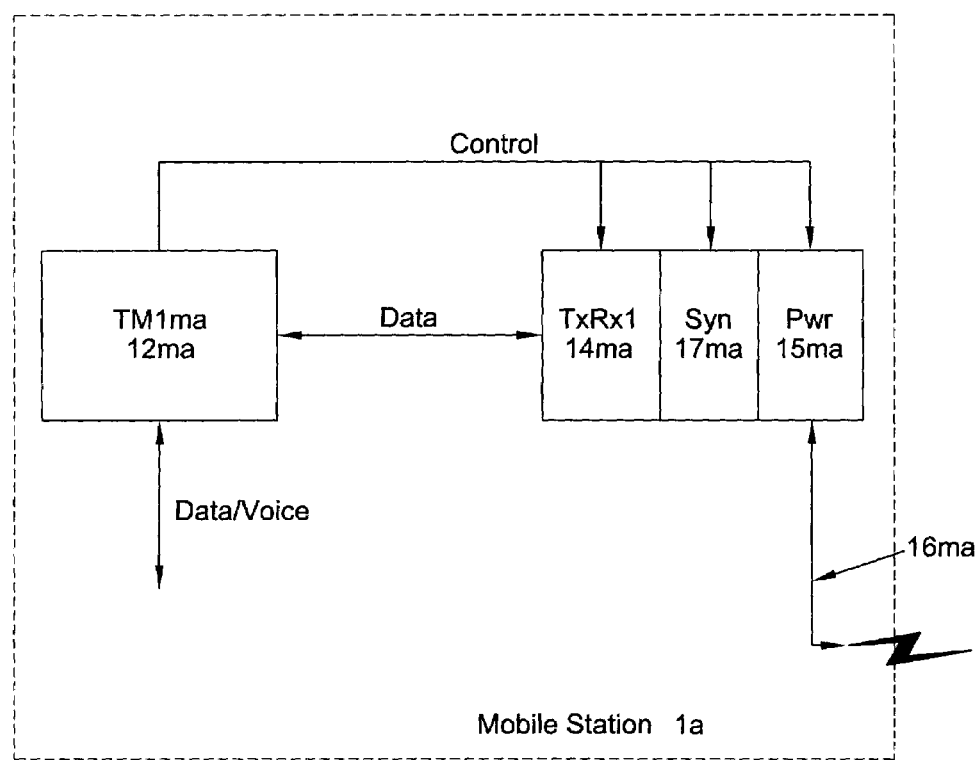
FIG. 2b is a schematic of a mobile station for the network of FIG. 1.

FIG. 2b is a schematic of a mobile station 1 having one air interface processing chain 16ma for communicating with the base station 2a of FIG. 2a. The mobile station 1 has an associated transmission and/or reception function or transceiver 14ma which has a transmission power control function 15ma which controls the level of transmission power for that transceiver 14ma and a synthesizer function 17ma that sets the transmit and receive frequency (or channel) of the transceiver. A transmission from the mobile to the base station can be received by any one of the transceivers 14a, 14b, 14c and 14d in the base station. Likewise the transmission from the base station to the mobile can be from any transceiver 14a, 14b, 14c and 14d. However, the channels (frequency) that transceivers 14a and 14ma are tuned to (via the synthesisers 17a and 17ma) and air interface technology (modulation and coding schemes etc.) used by the transceivers 14a and 14ma must be the same for the transmission to be successfully received.

The mobile station 1 has an AIP function 12ma which can receive requests to raise or lower transmitter power by the base station transceiver (14a). Normally this would be performed with air interface specific power control commands (i.e. directly between 14a and 14ma). Therefore, existing methods can be utilised for communicating power control commands to mobile stations. It could also utilise the same commands in the reverse direction (for requests from the mobile station to the base station transceiver 14). However, to convey request covering longer time periods with more advanced power management commands (such as with priority and QoS information) would require separate signalling methods (for example transmission sequences can be multicast or broadcast using user data or control channels).

The mobile may also contain more than one transceiver and in this case it could be implemented in an identical manner to the base station 2.

Figure 4A:
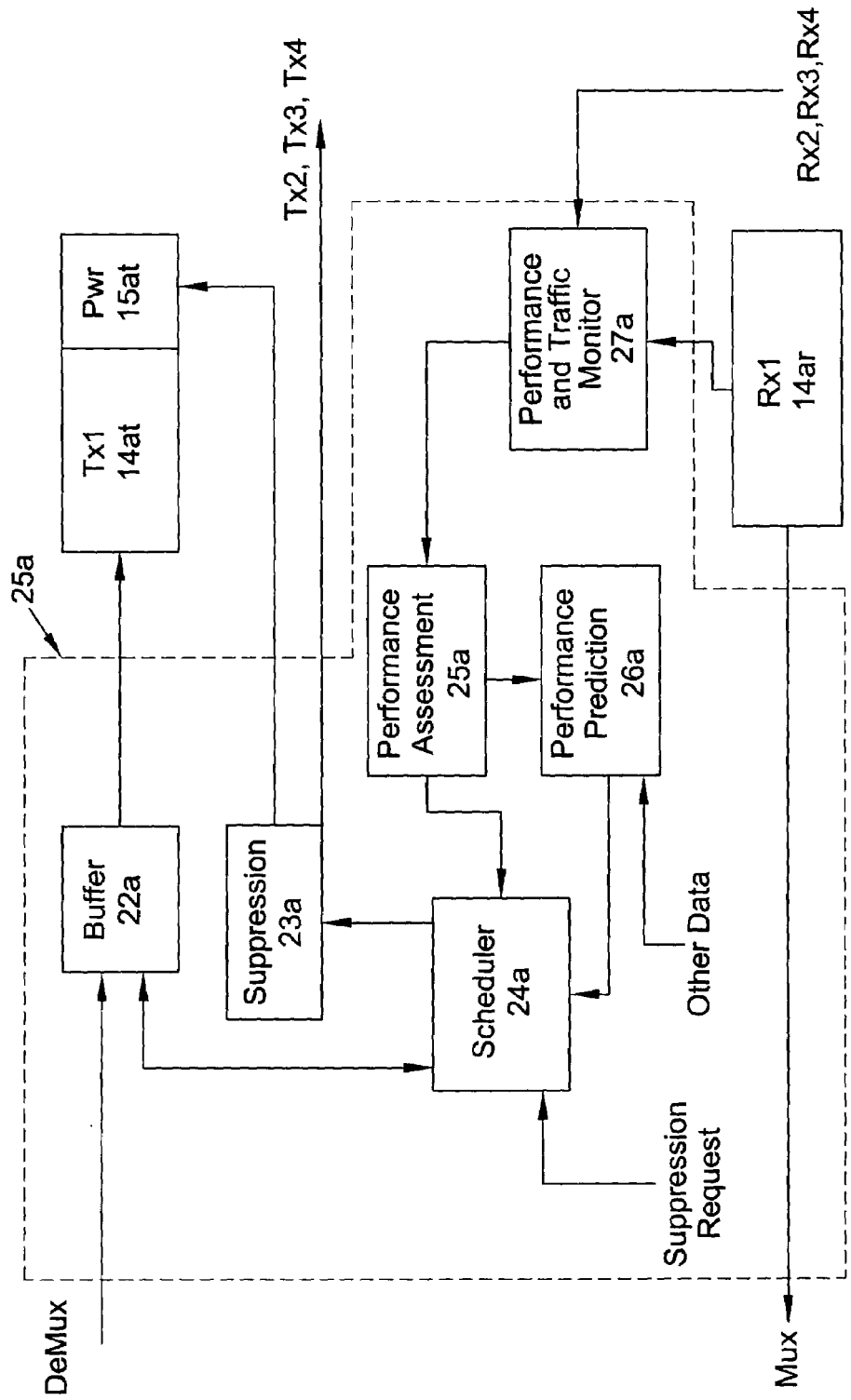
Figure 4B:
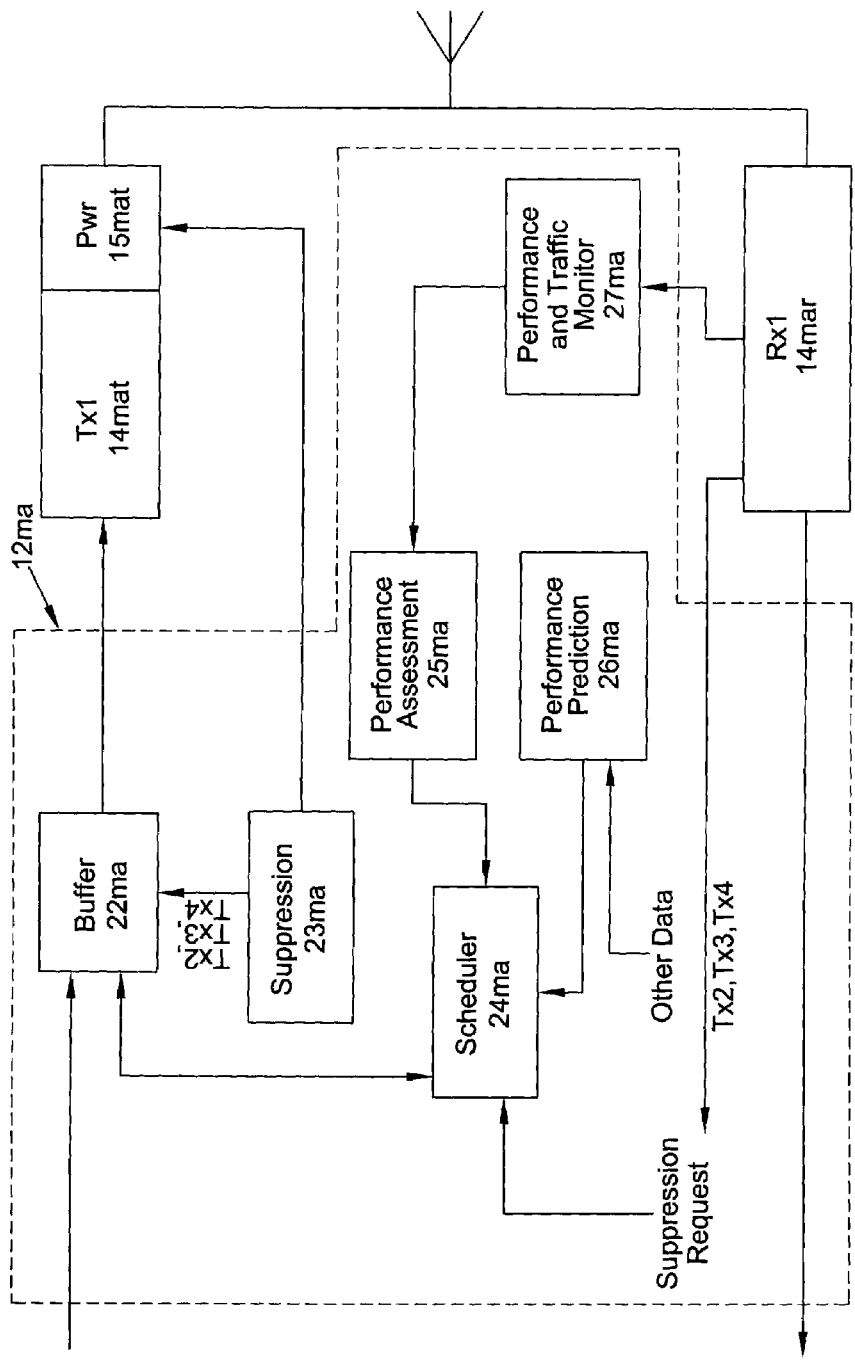
FIG. 4b is a schematic of the transmission management arrangement for the base station of FIG. 2b.

FIGS. 4a and 4b are schematics showing in more detail the TM functions 12 for the base stations 2 and mobile stations 1 respectively. For ease of explanation, reference is only made to other TM's and transceivers' existing within a single coverage area 5, that is by a single base station 2 and mobile stations 1 within the coverage area 5, as is typically the case in a PAN. It being understood that this can be expanded to incorporate TM's and transceivers associated with base stations and mobile stations in other coverage areas 5 such as in a WLAN for example, with the use of appropriate control signals over the network.

Referring to FIGS. 4a and 2a, the TM function 12a of base station 2a is associated with a transceiver 14a used for both reception and transmission, and comprises a first buffer 22 coupled between the demultiplexer 11 and the transmission/reception circuitry (shown as separate transmitter 14at and receiver 14ar functions for ease of explanation). The packet classification performed within the demultiplexer can utilise combinations of source/destination addressing, packet type, flow labels or packet QoS indicators to determine which transceivers to route the packets destined for the mobiles.

The power management functionality can be distributed between transceivers (14a, 14b, 14c and 14d) with one TM 12 per transceiver 14, as shown in FIG. 2a, alternatively a single TM can be implemented to control all transceivers. In either case the detailed functionality of the TM is the same as shown in FIG. 4a.

A scheduling function 24a, controls the transmission packet queue to determine when a packet requiring high QoS is present, and the transmission time this is scheduled to be transmitted. The required QoS is typically given in a predetermined field in each packet, or can be based on packet type, packet size, or destination/source address or packet flow label.

A suppression function 23a either instructs the power control function (15at) within the transceiver to reduce power level of a transmission or suspends the intended transmission of a packet until the next transmission opportunity (following the suppression period). The suppression can be achieved in a number of ways. For instance by reducing power level to in effect zero, which is likely to result in lost packets or higher layer retransmissions. Alternatively, the transceiver could be instructed to enter a sleep mode for a predetermined length of time.

A performance and traffic monitoring function 27a determines performance parameters associated with the receiver 14ar when receiving signals, for example measurements can be made of signal strength, bit error rate, packet latency, packet failure or retransmission rate or any combination of these. The monitoring function (27a) also observes traffic patterns or levels of activity, which are not necessary for normal operation, but can be used to make predictions about likely levels of interference by analysing packet arrivals and packet sizes. These various measurements are assessed by a performance assessment function 25a which monitors the affect of interference from other transceivers over time. This information can be used by the scheduler 24a to determine whether a packet with high QoS can be sent given transceiver 14a interference levels.

A performance prediction function 26a estimates the transceivers (14a) likely interference levels for upcoming transmission slots based on output from the performance assessment function 25a as well as other data from other TM functions. This other data might include future transmission options (taking into account frequency hop and channel offset patterns transmission deadlines and permissible power levels). It may even include information on what QoS level (or priority) the packets they will be transmitting in particular slots are intended to have.

From these predictions, the scheduler 24a determines whether a high QoS packet can be transmitted during a predetermined transmission slot based on the predicted interference level for the channel at that time. If the interference level is too high, the scheduler 24a selects a transceiver 14b (or transceivers) to reduce power and issues a corresponding request via the suppression function 23b to for that transceiver (14b). The request may include the priority level of the packet, the source(s) that needs to be suppressed, the length of time that suppression is required, and the level of suppression (for example in dB). If the scheduler's request is successful then it transmits the high QoS packet at the allotted transmission time slot. If the scheduler's 24a request is not successful, it either selects another transceiver 14c to reduce power (which it has determined will cause some interference and if this would satisfy the requirements) and performs another request, or delays the high QoS packet to another time slot. Alternatively the TM can be configured to instruct a change of channel (i.e. carrier frequency) which may or may not be possible depending on the air interface technology. A prediction is then made about the likely interference for that time slot and if necessary a reduce power message(s) is sent to a selected transceiver(s).

The scheduler 24a also receives requests to suppress a particular transmission slots from the associated suppression function 23 when a request to suppress (or reduce transmit power) from another transceiver (16b) is successful (i.e. the suppression function has accepted to reduce power or suppress the transmission).

The receiving part 14ar of the transceiver 14a is coupled to the multiplexer 11 of the base station 2a, which forwards incoming packets to the appropriate destination.

FIG. 4b shows a schematic of the TM function 12am for a mobile station 1 which is analogous to that of the base station, except that control signals such as reduce power requests are all sent over a wireless link.

A given PAN or WLAN (or combination) may incorporate both base station(s) and mobile stations implementing these functions, alternatively only one of these may use this arrangement.

The above described functions may be implemented by software and/or hardware accelerators such as ASIC's or FPGA for example.

The above described functions may be implemented by software and/or hardware accelerators such as ASIC's or FPGA for example.

An example implementation is described in more detail below. The base station 2 has four collocated transceivers 14a, 14b, 14c and 14d. The first two transceivers supporting the (cck modulated) 802.11b (14a and 14b) air interface and the second two the (frequency hopping fsk modulated) Bluetooth™ air interface (14c and 14d). In this example the QoS requirements can be met with fixed priority assignment in the order of 16a (being highest priority) to 16d (being lowest priority). Each transceiver has its own power control functionality 15a, 15b, 15c, 15d respectively. For simplicity only one mobile is associated with each transceiver 14a, 14b, 14c and 14d (denoted 1a, 1b, 1c and 1d respectively).

The mobile stations can receive TM specific power control commands but cannot perform other more complex power management functions.

The packet classification within the demultiplexer 11 ensures that the packets are routed to the different transceivers (and on to the mobiles 1a, 1b, 1c and 1d) based on destination address and packet type. The specification of the timing of suppression requires a shared clock of sufficient resolution to provide accurate estimation of when interference will be caused. In this case a clock with resolution of one Bluetooth™ time slot (625 microseconds) is used. Also, the power control method must be precise enough to allow for the different levels of performance required. The transceivers 14 each support 4 power levels (corresponding to approximate transmit power levels of 20 dBm, 10 dB, 4 dBm, 0 dBm). The performance assessment and prediction method utilise packet success rate (using packet CRC check) and latency.

When a packet is waiting transmission at the transceiver 14a, the corresponding scheduler function (24a) uses the performance predictor (26a) to discover whether there will be acceptable interference or not, using timing information obtained from the other transceivers scheduling functions (24b, 24c and 24d), frequency channel offset pattern information and the current transceivers performance assessment function (25a), which provides an indication of past performance. If the interference is deemed to be unacceptable (for example if the centre frequency between channels is less than a predetermined amount $\Delta f^1_{tr}$) a request is made to the appropriate transceivers suppression functions (23b, 23c and 23d) to suppress transmission by 1 level (i.e. 1 level below that of the 14a transceiver) for the period in which the performance predictor (26a) indicates that interference will be caused. If the separation between channel centre frequencies is less than $\Delta f^2_{tr}$ then a request is made to the appropriate transceivers suppression functions (23b, 23c and 23d) to suppress transmission by 2 levels (i.e. 2 levels below that of the 14a transceiver). If the separation between channel centre frequencies is less than $\Delta f^3_{tr}$ then a request is made to the appropriate transceivers suppression functions (23b, 23c and 23d) to suppress transmission by 3 levels (i.e. 3 levels below that of the 14a transceiver). If the separation between channel centre frequencies is less than $\Delta f^4_{tr}$ then a request is made to the appropriate transceivers suppression functions (23b, 23c and 23d) to suppress transmission by 4 levels (i.e. 4 levels below that of the 14a transceiver).

If the transmit power level of the current transceiver 14a is less than the highest level, the scheduler (24a) can simultaneously request to increase the power level of transceiver 14a (to the power controlling function 15a) while also sending the suppression requests to the other transceivers suppression functions, (23b, 23c and 23d).

Likewise, the reception of a packet at the transceiver 14a is predicted by the monitoring function (27a) observing the traffic pattern. The pattern in this case is a regular group of packets at a fixed interval and so the arrival of the next group of packets is easily predicted. When the next group of packets is expected, the performance monitor function (27a) uses the performance predictor (26a) to discover whether there will be acceptable interference or not, using timing information obtained from the other transceivers scheduling functions (24b, 24c and 24d), frequency channel offset pattern information and the current transceivers performance assessment function (25a), which provides an indication of past performance. In the same way as for packet transmission, if the interference is deemed to be unacceptable (in this case if the centre frequency between channels is less than $\Delta f^1_{rt}$) a request is made to the appropriate transceivers suppression functions (23*b*, 23*c* and 23*d*) to suppress transmission by 1 level (i.e. 1 level below that of the 16*a* transceiver) for the period in which the performance predictor (26*a*) indicates that interference will be caused. If the separation between channel centre frequencies is less than $\Delta f^2_{rt}$ then a request is made to the appropriate transceivers suppression functions (23*b*, 23*c* and 23*d*) to suppress transmission by 2 levels (i.e. 2 levels below that of the 14*a* transceiver). If the separation between channel centre frequencies is less than $\Delta f^3_{rt}$ then a request is made to the appropriate transceivers suppression functions (23*b*, 23*c* and 23*d*) to suppress transmission by 3 levels (i.e. 3 levels below that of the 16*a* transceiver). If the separation between channel centre frequencies is less than $\Delta f^4_{rt}$ then a request is made to the appropriate transceivers suppression functions (23*b*, 23*c* and 23*d*) to suppress transmission by 4 levels (i.e. 4 levels below that of the 16*a* transceiver).

The same functionality is implemented in the other TM's 12*b*, 12*c* and 12*d*.

In this case frequency offset has been used as the main decision criteria. Alternatively, in fixed frequency systems for example, the modulation scheme and/or antenna direction (in the case of directional antennas) could be used.

The embodiment is applicable to any radio networking protocol, for example Bluetooth™ for a PAN arrangement, and HiperLan or IEEE802.11 for a WLAN arrangement. The channels may be defined by any known means, for example by frequency, code, time slot or spatial multiplexing. It could also be applied in device-to-device communications where two or more channels are used simultaneously.

Figure 5:
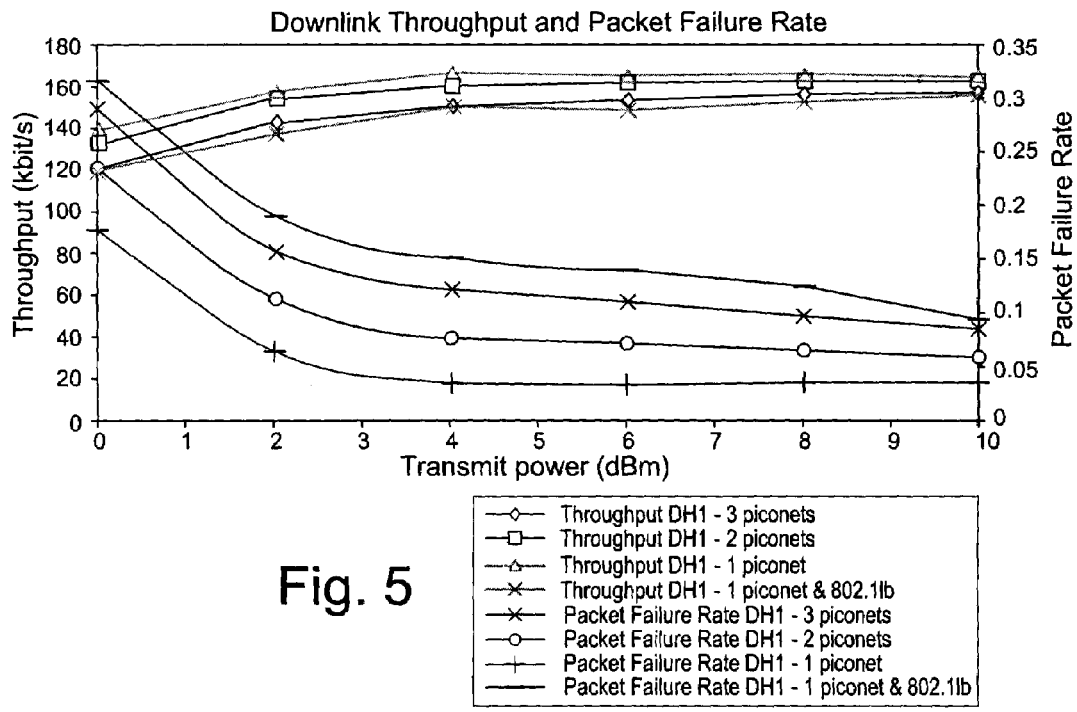
FIG. 5 is a graph of the performance of a network of collocated Bluetooth™ piconets.

The embodiment efficiently supports different levels of quality of service with bursty traffic characteristics. This enables more efficient utilisation of radio resources and improves support for different services and applications. FIG. 5 shows the performance of Bluetooth™ with collocated piconets. The packet failure rate could easily be unacceptable for many applications. Therefore suppression of interfering piconets when interference is unacceptable makes this traffic supportable (in this example the packet failure rate would fall from over 10% with 3 collocated piconets to around 3%). Other services can easily sustain 10% packet failure rate with standard retransmission mechanisms.

Figure 6:
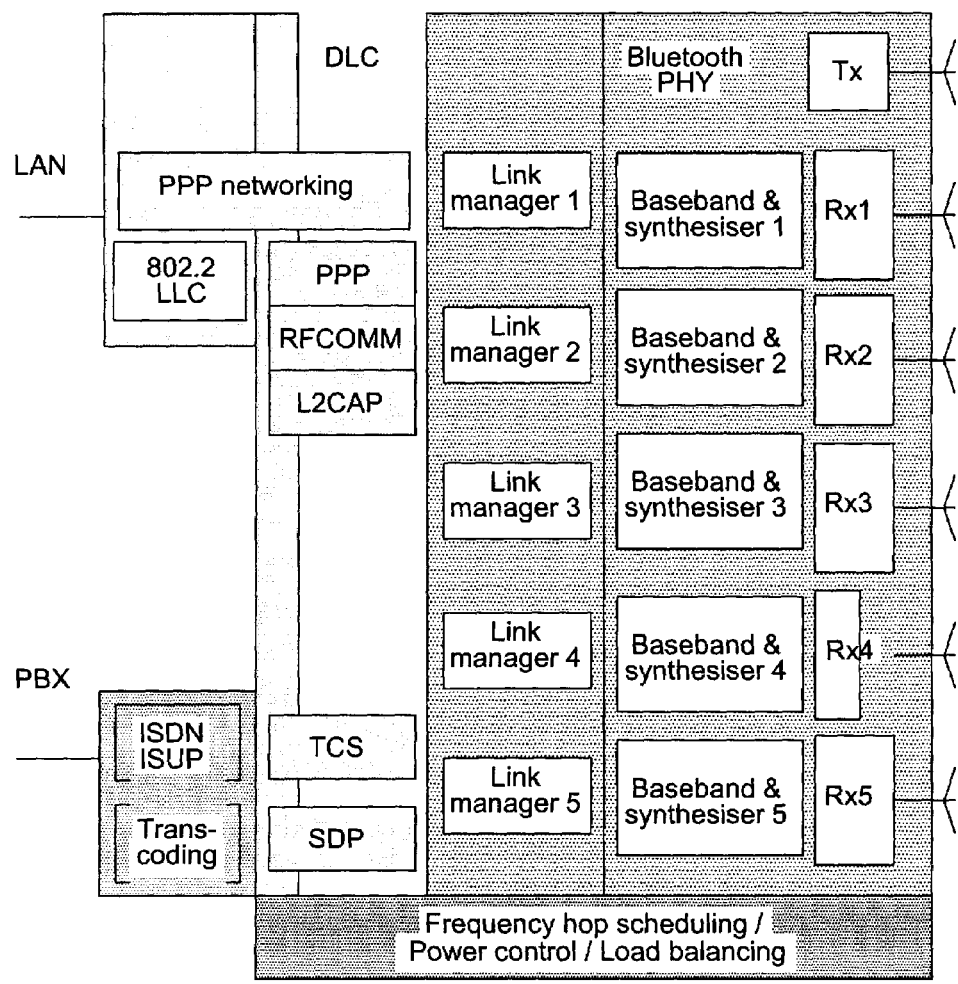
FIG. 6 is a schematic of a Bluetooth™ access point.

FIG. 6 shows a Bluetooth™ access point implementation. In this arrangement the piconets are overlapping in physical space, each providing a single channel to wirelessly couple a single mobile station to the access point.

One or more of these piconets is designated to support higher QoS than the others, for example to carry MPEG4 base layer frames. Expected interference is thus measured or predicted with respect to the dedicated high QoS piconets, the other piconets having their power levels suppressed as required.

Figure 7:
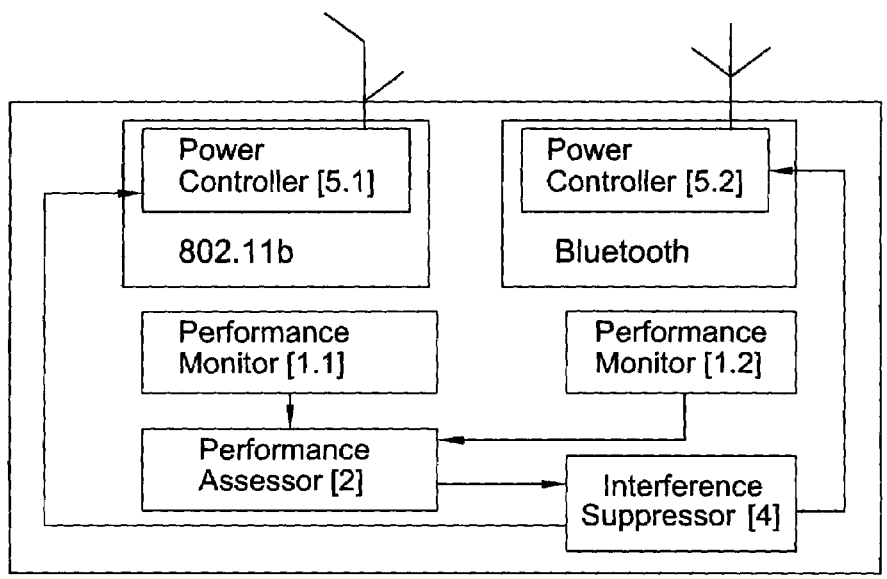
FIG. 7 is a schematic of a device supporting both Bluetooth™ and IEEE802.11b protocols.

FIG. 7 shows a device which supports both Bluetooth™ and IEEE802.11 protocols. Here Bluetooth™ might support a voice call whereas 802.11 supports data transfer. The QoS of the Bluetooth™ connection is more important than the 802.11 connection, as packet retransmission is not a good option for a voice call. Therefore the performance assessor suppresses the 802.11 transmissions while the Bluetooth™ system is receiving or transmitting. In this case the performance prediction is simply based on frequency separation between the Bluetooth™ and 802.11 systems.

The invention has been described with respect to embodiments thereof. Alterations and modifications as would be obvious to those skilled in the art are intended to be incorporated within the scope thereof.

The invention claimed is:

1. A method of controlling the transmission power associated with a first air interface channel, the method comprising:
   determining a quality of service measure for a signal to be transmitted on a second air interface channel;
   determining an interference measure corresponding to the interference on said second air interface channel which will be caused by transmissions on said first air interface channel;
   requesting the changing of the transmission power associated with the first air interface channel when the signal is to be transmitted on the second air interface channel, when the quality of service measure is above a predetermined value and when the interference measure is above a predetermined value for said quality of service value.

2. A method as claimed in claim 1 further comprising changing the transmission power associated with the first air interface channel when the signal is to be transmitted on the second air interface channel.

3. A method as claimed in claim 1 further comprising postponing or suppressing the transmission associated with the first air interface channel when the signal is to be transmitted on the second air interface channel.

4. A method as claimed in claim 1 wherein the quality of service measure and the interference measure determinations are based on the prediction of likely quality of service requirements and interference levels.

5. A method as claimed in claim 1 wherein determining the interference measure comprises determining whether the signal to be transmitted or received over the first air interface channel will occur within the same time frame as transmissions on the second air interface channel.

6. A method as claimed in claim 1 wherein the air interface channels are associated with different air interface technologies.

7. A method of allocating power levels to transceivers in a wireless network having a base station and two or more mobile stations using said transceivers; the method comprising:
   determining whether a signal to be transmitted over a first said transceiver has a high QoS indicator;
   determining whether any of said other transceivers will cause a predetermined level of interference to occur on said first transceiver when said signal is to be transmitted;
   instructing the reduction of the transmission power levels of one or more said other transceivers when said traffic signal is transmitted over said first transceiver.

8. A method as claimed in claim 7 wherein the transceivers are collocated.

9. A method of allocating power levels to transceivers in a wireless network having a base station and two or more mobile stations using said transceivers; the method comprising:
   allocating one said transceiver for high quality of service signals;
   instructing another said transceiver to reduce its transmission power level if it would otherwise interfere with the high quality of service signal by above a predetermined amount.

10. An apparatus for controlling the transmission power associated with an air interface channel, and which comprises:

a processor or software module arranged to determine a quality of service measure for a signal to be transmitted on a second air interface channel;

a processor or software module arranged to determine an interference measure corresponding to the interference on said second air interface channel which will be caused by transmissions on said first air interface channel;

a processor or software module arranged to request the changing of the transmission power associated with the first air interface channel when the signal is to be transmitted on the second air interface channel, when the quality of service measure is above a predetermined value and when the interference measure is above a predetermined value for said quality of service value.

11. An apparatus as claimed in claim 10 further comprising a processor or software module arranged to change the transmission power associated with the first air interface channel when the signal is to be transmitted on the second air interface channel.

12. An apparatus as claimed in claim 10 further comprising a processor or software module arranged to postpone or suppress the transmission associated with the first air interface channel when the signal is to be transmitted on the second air interface channel.

13. An apparatus as claimed in claim 10 wherein the quality of service measure and the interference measure determinations are based on the prediction of likely quality of service requirements and interference levels.

14. An apparatus as claimed in claim 10 wherein the processor or software module arranged to determine the interference measure comprises a processor or software module arranged to determine whether the signal to be transmitted or received over the first air interface channel will occur within the same time frame as transmissions on the second air interface channel.

15. An apparatus as claimed in claim 10 wherein the air interface channels are associated with different air interface technologies.

16. An apparatus for allocating power levels to transceivers in a wireless network having a base station and two or more mobile stations using said transceivers; the apparatus comprising:

a processor or software module arranged to determine whether a signal to be transmitted over a first said transceiver has a high QoS indicator;

a processor or software module arranged to determine whether any of said other transceivers will cause a predetermined level of interference to occur on said first transceiver when said signal is to be transmitted;

a processor or software module arranged to instruct the reduction of the transmission power levels of one or more said other transceivers when said signal is transmitted over said first transceiver.

17. An apparatus as claimed in claim 16 wherein the transceivers are collocated.

18. An apparatus for allocating power levels to transceivers in a wireless network having a base station and two or more mobile stations using said transceivers; the apparatus comprising:

a processor or software module arranged to allocate one said transceiver for high quality of service signals;

a processor or software module arranged to instruct another said transceiver to reduce its transmission power level if it would otherwise interfere with a high quality of service signal by above a predetermined amount.

19. A carrier medium carrying processor readable code for controlling a processor to carry out the method according to claim 1.

* * * * *